Aug. 4, 1931.  H. S. RUMSEY  1,817,649
SETTLING APPARATUS
Filed Jan. 19, 1928   3 Sheets-Sheet 1

INVENTOR
H.S. RUMSEY
BY J.H.S. Cook
ATTORNEY

Aug. 4, 1931.  H. S. RUMSEY  1,817,649
SETTLING APPARATUS
Filed Jan. 19, 1928   3 Sheets-Sheet 2

INVENTOR
H.S. RUMSEY
BY
ATTORNEY

Aug. 4, 1931.   H. S. RUMSEY   1,817,649
SETTLING APPARATUS
Filed Jan. 19, 1928   3 Sheets-Sheet 3

INVENTOR
H.S. RUMSEY
BY J.H.G. Cook
ATTORNEY

Patented Aug. 4, 1931

1,817,649

UNITED STATES PATENT OFFICE

HORACE S. RUMSEY, OF ST. LOUIS, MISSOURI

SETTLING APPARATUS

Application filed January 19, 1928. Serial No. 247,978.

This invention relates to an improved process and apparatus for use in separating comminuted solids from liquids in which the solids are held in suspension, and is illustrated herein as embodied in a multiple tray settling tank capable of carrying out the improved process, which, for the sake of convenience will hereinafter be referred to as a continuous gravity settling process.

An important feature of the invention consists in the provision of a settler of the character described in which the conglomerated liquid is admitted through a central passageway to a plurality of superimposed settling chambers provided with vertically alined openings, extending radially of the central passageway, through which the comminuted particles are discharged, and with a plurality of additional passageways through which the clarified liquid is discharged. To the end of expediting the settling operation, each settling chamber is provided with a mechanically actuated sweep, which moves over the floor of the chamber and drives the settled solid particles towards the radially extending, vertically alined openings. The solids fall, by gravity, through the alined openings into a concentrating chamber located in the bottom of the settler, and are carried away through a discharge passageway, whereas, the clarified liquid is conducted through discharge passageways to an accumulating tank located outside the settling apparatus.

It is particularly desirable that settled solid particles be kept out of contact with the clarified liquid to prevent re-conglomeration, and to this end an important feature of the invention consists in providing the radially extending openings with aprons which extend downwardly from the opening in one chamber and terminate a short distance above the floor of the next lower chamber. By means of such an arrangement, the settled particles drop, by gravity, through spaces unoccupied by the clarified liquid, and are discharged without subsequently coming in contact with the fluid out of which they have already been separated.

In the practice of the novel process, the conglomerated liquid is introduced centrally into a chamber, the clarified liquid is drawn off at points radially removed from the center, the solid particles settle to a locality beneath the clarified liquid, are moved transversely of the direction of flow of the liquid, and are discharged downwardly through openings extending parallel to the direction of flow of the liquid.

By virtue of the improved process and apparatus above described, the settling chambers function rapidly, the settled solids are kept separated from the clarified liquid, and, of extreme importance, the settled particles are removed promptly from the chambers within which they have accumulated.

Other important features and objects of the invention will become apparent from a reading of the following specification in the light of the accompanying drawings, in which, Fig. 1 is a view in front elevation in section of a settling tank embodying the invention;

Figure 1:
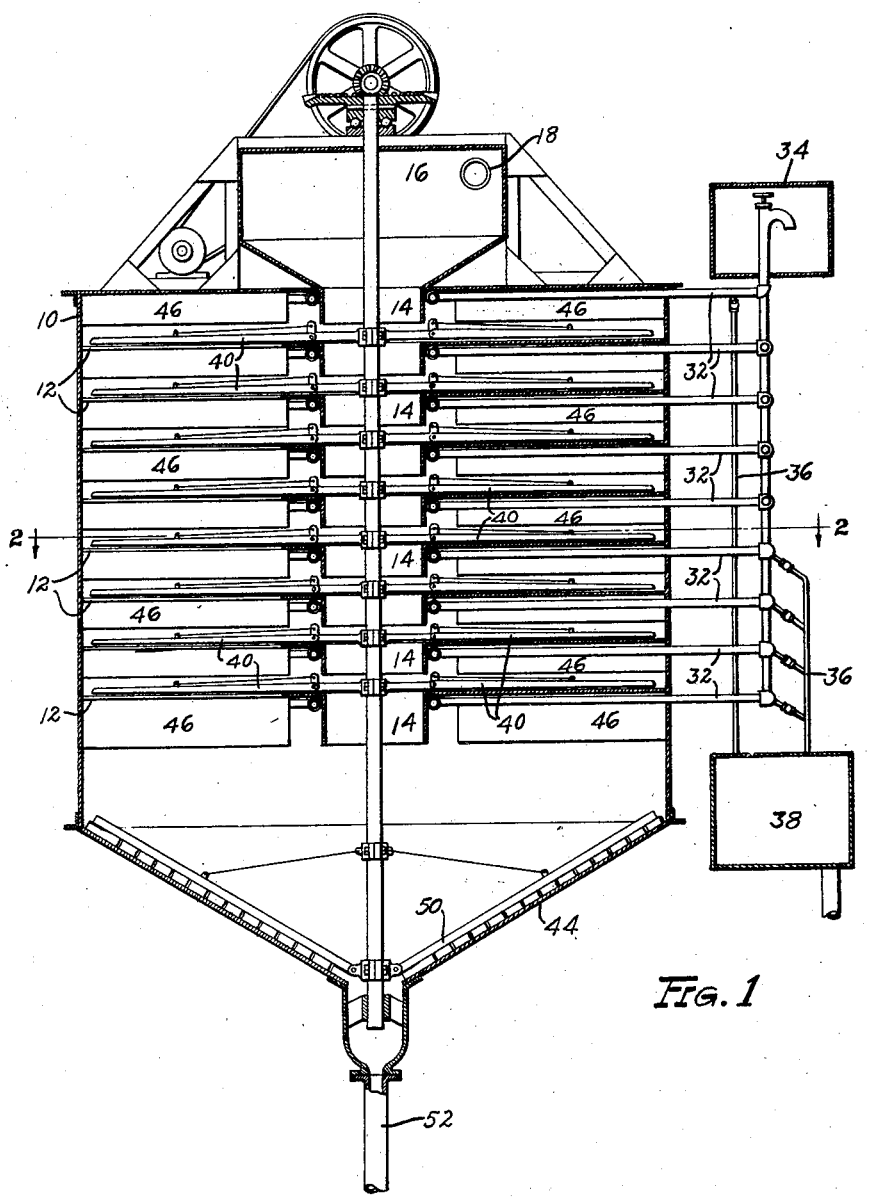

As shown in the drawings, the reference numeral 10 indicates a cylindrical wall which constitutes the outside of the settling tank. Arranged to extend substantially horizontally, transversely of the wall 10, are a plurality of trays or partitions 12 provided with vertically alined central openings defined by the inner walls of the depending flanges 14.

To the end of filling, and feeding, the settling tank, a hopper 16 having a feed pipe 18 communicating therewith is disposed immediately above the alined central openings within the trays 12. Into this hopper there is fed liquid having comminuted particles in suspension therein, and from thence the liquid flows by gravity downwardly into the interior of the settling tank. As the tank is filling the liquid level will rise until it reaches the top, whereupon the conglomerated liquid subsequently flows radially of the central passageway, between the lower edges of the flanges 14 and the trays 12, outwardly across the surfaces of the trays or partitions 12. With the liquid flowing radially towards the outer wall 10 of the tank, the comminuted particles in the liquid settle and come to rest on the floors of the chambers formed by adjacent partitions 12, and the lighter, clarified liquid rises to the top of the chambers and is discharged.

Figure 2:
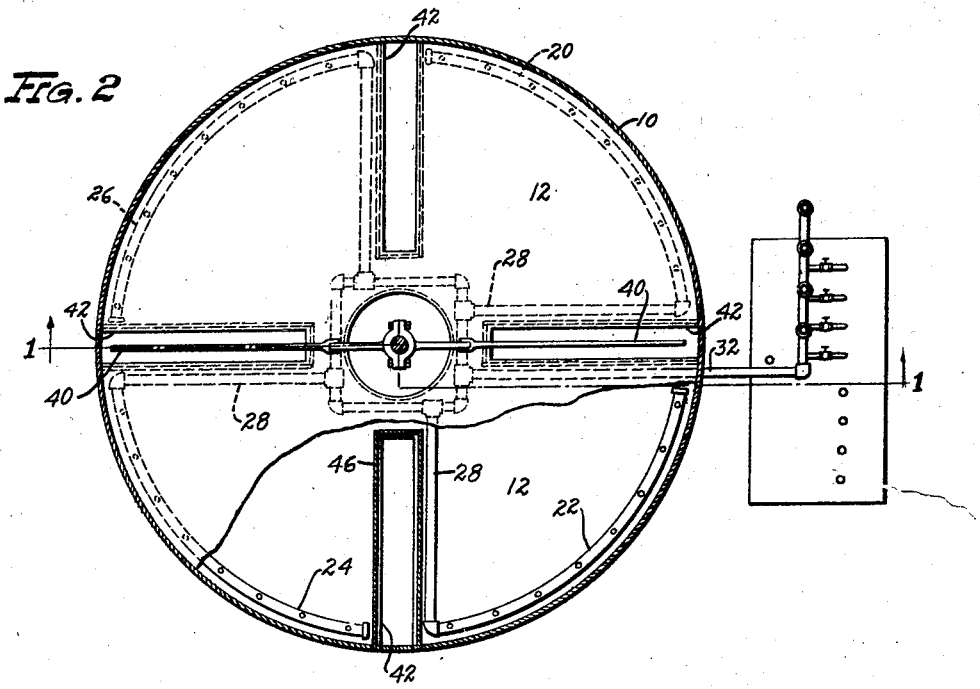
Fig. 2 is a plan view in section taken along the line 2—2 of Fig. 1 and having certain parts broken away.
Figure 3:
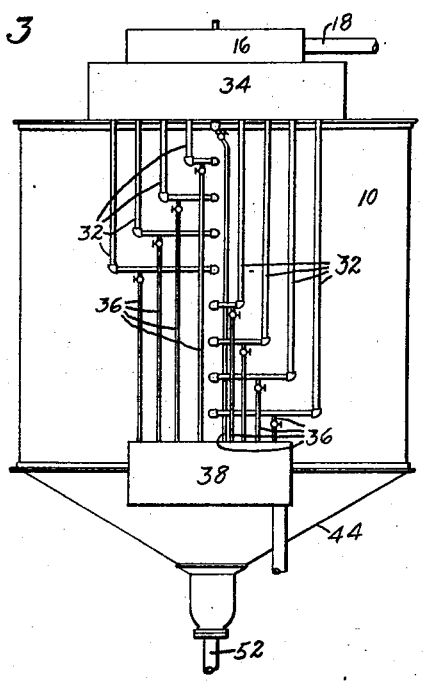
Fig. 3 is a side elevation of the apparatus shown in Fig. 1.

To the end of discharging the clarified liquid from the settling chambers, each chamber is, as shown in Fig. 2, provided at its upper, outward portion with a series of perforated segmental conduits 20, 22, 24, 26 which communicate, by means of take off pipes 28 with a common discharge pipe 30 that surrounds the flange 14 extending into the chamber, and feed, by means of a pipe 32 into a tank 34. Since all of the discharge pipes 32 leading from the settling chambers are in vertical alinement, it is necessary, to offset the pipes as they lead to the tank 34 in some convenient manner, as, for example, that shown in Fig. 3.

It is to be observed that the tank 34 is on approximately the same level as the hopper 16, whereby a hydrostatic head is created such that the settler will operate only so long as the liquid level in the hopper is higher than that in the tank. In being put out of operation, the flow of liquid into the hopper is stopped and as soon as the liquid level in the hopper reaches the same level as that in the tank 34, the flow of clarified liquid ceases. In order that the pipes 32 may drain the settling tank of any clarified liquid remaining therein after the hydrostatic heads have reached a balance, each of the pipes 32 is provided with a drain 36 that extends downwardly into a drainage tank 38.

So much of the description as has already been given relates to the manner of handling and disposing of the clarified liquid, and the following paragraphs will be devoted to a discussion of the way in which the comminuted particles are settled out of the liquid and carried away.

As the conglomerated liquid flows radially outward above the trays or partitions 12, the comminuted particles settle and come to rest on the upper surfaces of the trays, (or the floors of the settling chambers). From this position the settled particles are moved slowly, by means of mechanically rotated sweeps 40, in the direction of discharge openings 42 formed in the trays 12. As illustrated, there are four of these openings in each of the trays and the openings in the several trays are in vertical alinement, thus there are presented four passageways extending from the top tray through the bottom tray for conducting the settled particles from the trays downwardly to a concentration chamber located within a conical shaped bottom portion 44 of the tank.

To the end of preventing the settled particles from re-conglomerating the clarified liquid by again coming in contact with it, each of the openings 42 is surrounded by a downwardly depending flange or apron 46 which extends from the lower side of one tray and terminates a short distance above the next adjacent tray. By virtue of such a provision the clarified liquid gathered in the upper portion of the settling chambers is in contact with the depending flanges 46 of the openings 42 but, by reason of the flanges, cannot come in contact with the settled comminuted particles passing downwardly through the openings.

The openings 42 are elongated, and, as shown, extend radially of the central openings within the trays. Such a construction permits the settled solids to be moved circumferentially of the tank to discharge openings, and the clarified liquid to move radially to discharge openings, thereby providing a gravity settling process that operates continuously (as compared with progressively) and rapidly in discharging both the liquid and the solid matter. Owing to the fact that the inner ends of the openings 42 are much closer together than are the outer ends, the heavier comminuted particles which are the first to settle on the tray are not moved nearly so far in being discharged as are the lighter particles which settle farther away from the inner ends of the openings. Furthermore, since comminuted particles are constantly falling through the openings 42 a certain current will be continuously operating through these openings tending to move the lighter particles entering above the tray in the direction of the openings so that concentration of comminuted matter deposited on the trays will be adjacent to the inner ends of the openings 42 whereby the deposit is moved to the discharge opening through the shortest path possible. To be compared with such a feature are those settlers in which the heavier comminuted matter settles on the tray near the central opening but must be moved before being discharged, completely across the trays to a circumferential opening which surrounds the outside edge of the tray.

The bottom 44 of the tank is surmounted by a scraper 50 which tends to move the accumulated solid particles inwardly to a central discharge opening 52 through which the separated solids are carried away.

Figure 4:
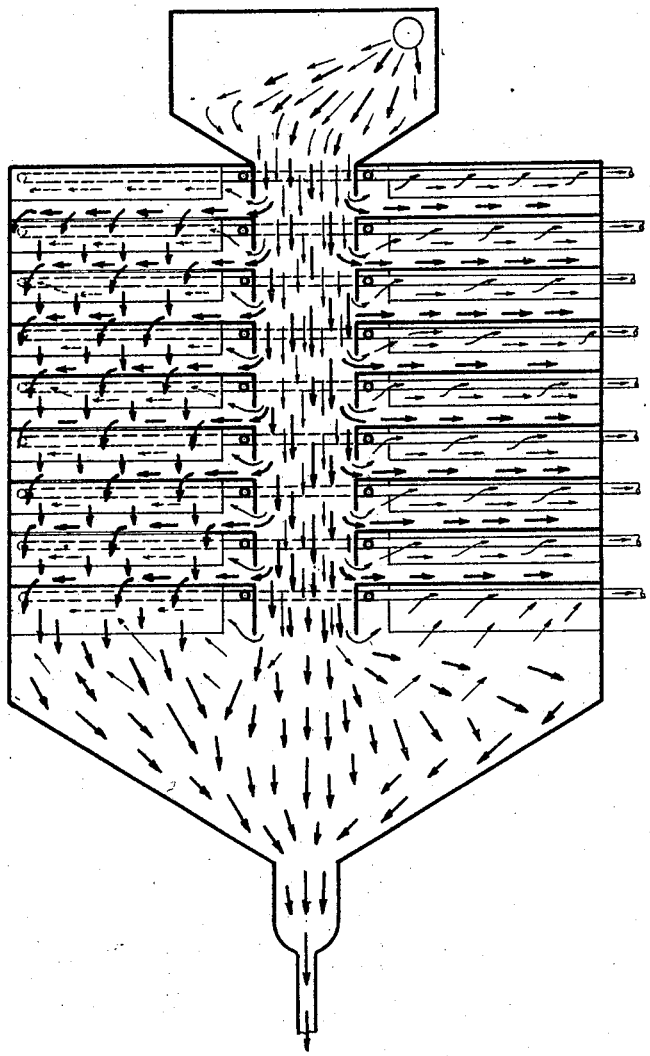
Fig. 4 is a diagrammatic view indicating the manner in which the tank performs a settling operation.

The foregoing paragraphs describe amply the operation of the tank, and Fig. 4 of the drawings, in which the heavy arrows indicate the solid particles and light arrows the clarified liquid illustrates clearly the mode of operation.

It is to be understood that the invention disclosed herein contemplates being employed in settling tanks of all characters for use in performing various separating, settling and filtering operations. Such operations include separating the pulp from the liquid in paper manufacturing, separating the mud and the clear juice out of the raw juice in the manufacture of sugar, etc.

Having thus described my invention what I claim as new and desire to secure by Letters Patent of the United States is:

1. An apparatus for separating comminuted particles from a liquid in which they are suspended, comprising in combination, a cylindrical outer wall, a plurality of substantially horizontal transverse partitions therein terminating flush with the outer wall and having alined central openings providing a vertically disposed inlet passageway communicating directly with the spaces above the horizontal partitions in a direction transversely of the apparatus, moving means for advancing the comminuted particles which settle on each of the horizontal partitions toward elongated openings formed in the partitions, the openings being arranged to extend radially of the cylindrical outer wall and being in the path of movement of the major portion of said moving means, and discharge means for clarified liquid comprising pipes extended circumferentially of the horizontal transverse partitions.

2. An apparatus for separating comminuted particles from a liquid in which they are suspended comprising in combination, a plurality of superimposed settling trays having alined central openings therein and elongated openings extending radially of the central openings, said alined central openings providing a vertically disposed inlet passageway communicating directly with the spaces above the superimposed settling trays in a direction transversely of the apparatus, moving means for sweeping the comminuted particles which settle on the trays toward the elongated openings whereby the particles discharge through the elongated openings, and said elongated openings being in the path of travel of the major portion of said moving means, and discharge means for clarified liquid comprising pipes extended circumferentially of the trays.

In testimony that I claim the foregoing I hereunto affix my signature.

HORACE S. RUMSEY.